(12) United States Patent
Kurata et al.

(10) Patent No.: US 7,032,923 B2
(45) Date of Patent: Apr. 25, 2006

(54) AIR BAG APPARATUS FOR A SMALL SIZE VEHICLE

(75) Inventors: Norihiro Kurata, Saitama (JP);
Takeshi Yamazaki, Saitama (JP);
Takeshi Kuroe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/419,136

(22) Filed: Apr. 21, 2003

(65) Prior Publication Data
US 2004/0007855 A1 Jan. 15, 2004

(30) Foreign Application Priority Data
Apr. 22, 2002 (JP) ............... 2002-118664

(51) Int. Cl.
*B60R 21/16* (2006.01)
(52) U.S. Cl. ............... 280/732; 280/743.2; 280/730.1
(58) Field of Classification Search ............ 280/728.2, 280/728.3, 729, 730.1, 732, 733, 743.1, 743.2
See application file for complete search history.

(56) References Cited

U.S. PATENT DOCUMENTS

| | | | |
|---|---|---|---|
| 3,747,952 A * | 7/1973 | Graebe | 280/730.1 |
| 4,265,468 A * | 5/1981 | Suszko et al. | 280/729 |
| 5,301,902 A * | 4/1994 | Kalberer et al. | 244/121 |
| 5,400,487 A * | 3/1995 | Gioutsos et al. | 280/735 |
| 5,460,405 A * | 10/1995 | Faigle et al. | 280/735 |
| 5,938,231 A * | 8/1999 | Yamazaki | 280/730.1 |
| 6,168,197 B1 * | 1/2001 | Paganini et al. | 280/735 |
| 6,336,653 B1 * | 1/2002 | Yaniv et al. | 280/730.1 |
| 6,431,583 B1 * | 8/2002 | Schneider | 280/728.2 |
| 6,808,198 B1 * | 10/2004 | Schneider et al. | 280/730.1 |
| 6,834,886 B1 * | 12/2004 | Hasebe et al. | 280/743.1 |
| 2003/0116945 A1 * | 6/2003 | Abe | 280/729 |

FOREIGN PATENT DOCUMENTS

JP 2001-219884 A 8/2001
JP 2001392078 * 12/2001

* cited by examiner

*Primary Examiner*—Paul N. Dickson
*Assistant Examiner*—Toan C. To
(74) *Attorney, Agent, or Firm*—Birch, Stewart, Kolasch & Birch, LLP

(57) ABSTRACT

To provide an air bag apparatus for a small size vehicle, wherein a seat for a driver is provided at a rear portion of a vehicle body and an instrument panel, which a driver on the seat can visually observe is provided at a front portion of the vehicle body. The air bag apparatus assures a wide range of inflation and expansion of an air bag and can be applied to a conventional small size vehicle without a significant design change. A plurality of air bags which can constrain a driver on a seat from a forward direction are connected to each other by a connection mechanism and are accommodated in a folded state in an instrument panel.

15 Claims, 6 Drawing Sheets

AIR BAG APPARATUS FOR A SMALL SIZE VEHICLE

CROSS-REFERENCE TO RELATED APPLICATIONS

This nonprovisional application claims priority under 35 U.S.C. § 119(a) on Patent Application No. 2002-118664, filed in Japan on Apr. 22, 2002, the entirety of which is incorporated herein by reference.

BACKGROUND OF THE INVENTION

1. Field of the Invention

The present invention relates to a small size vehicle, wherein a seat for a driver is provided at a rear portion of a vehicle body and an instrument panel, which a driver on the seat can visually observe, is provided at a front portion of the vehicle body. More particularly, the present invention relates to improvements in an air bag apparatus provided in a small size vehicle.

2. Description of Background Art

Conventionally, in a motorcycle disclosed in the official gazette of, for example, Japanese Patent Laid-Open No. 2001-219884, a single air bag in a folded state is disposed forwardly of a handle bar or the motorcycle.

In order to effectively constrain the driver on the seat, it is necessary for the air bag to be inflated and expanded to a wider range. If a single air bag is used such that it is expanded to a wide range, then it is difficult with a conventional small size vehicle such as a motorcycle to assure a space for accommodation of a large size air bag. Accordingly, it is sometimes necessary to effect significant design changes to accommodate such an air bag.

SUMMARY OF THE INVENTION

The present invention has been made in view of the above-described circumstance. It is an object of the present invention to provide an air bag apparatus for a small size vehicle, which assures a wide range of inflation and expansion of an air bag and can be applied to a conventional small size vehicle without the necessity of significant design changes to accommodate the air bag.

In order to attain the above-described object, according to a first aspect of the present invention, a small size vehicle includes a seat for a driver provided at a rear portion of a vehicle body and an instrument panel, which a driver on the seat can visually observe, provided at a front portion of the vehicle body. An air bag apparatus for the small size vehicle includes a plurality of air bags, which can constrain the driver on the seat from a front of the driver. The plurality of air bags are connected to each other by a connection mechanism and are accommodated in a folded state in the instrument panel.

With the above configuration, when the plurality of air bags are inflated and expanded, all of the air bags are connected to each other by the connection mechanism and are expanded over a wide range. Thus, the function of a large air bag can be secured by the plurality of small air bags while a wide range of expansion can be covered by the plurality of air bags to constrain the driver effectively. In addition, since each of the air bags may be of a small size, it is easy to assure the space for accommodating the air bags, and the air bag apparatus can be applied to a conventional small size vehicle without the necessity of significant design changes to accommodate the air bags.

Furthermore, according to a second aspect of the present invention, the air bag apparatus for a small size vehicle is provided, wherein the connection mechanism connects a pair of left and right air bags accommodated in a folded state on the opposite left and right sides of the instrument panel to each other. The connection mechanism is securely fastened to the vehicle body. With the above configuration, leftward and rightward movements of the pair of left and right inflated and expanded air bags can be restricted by the connection mechanism, which is securely fastened to the vehicle body to constrain the driver effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
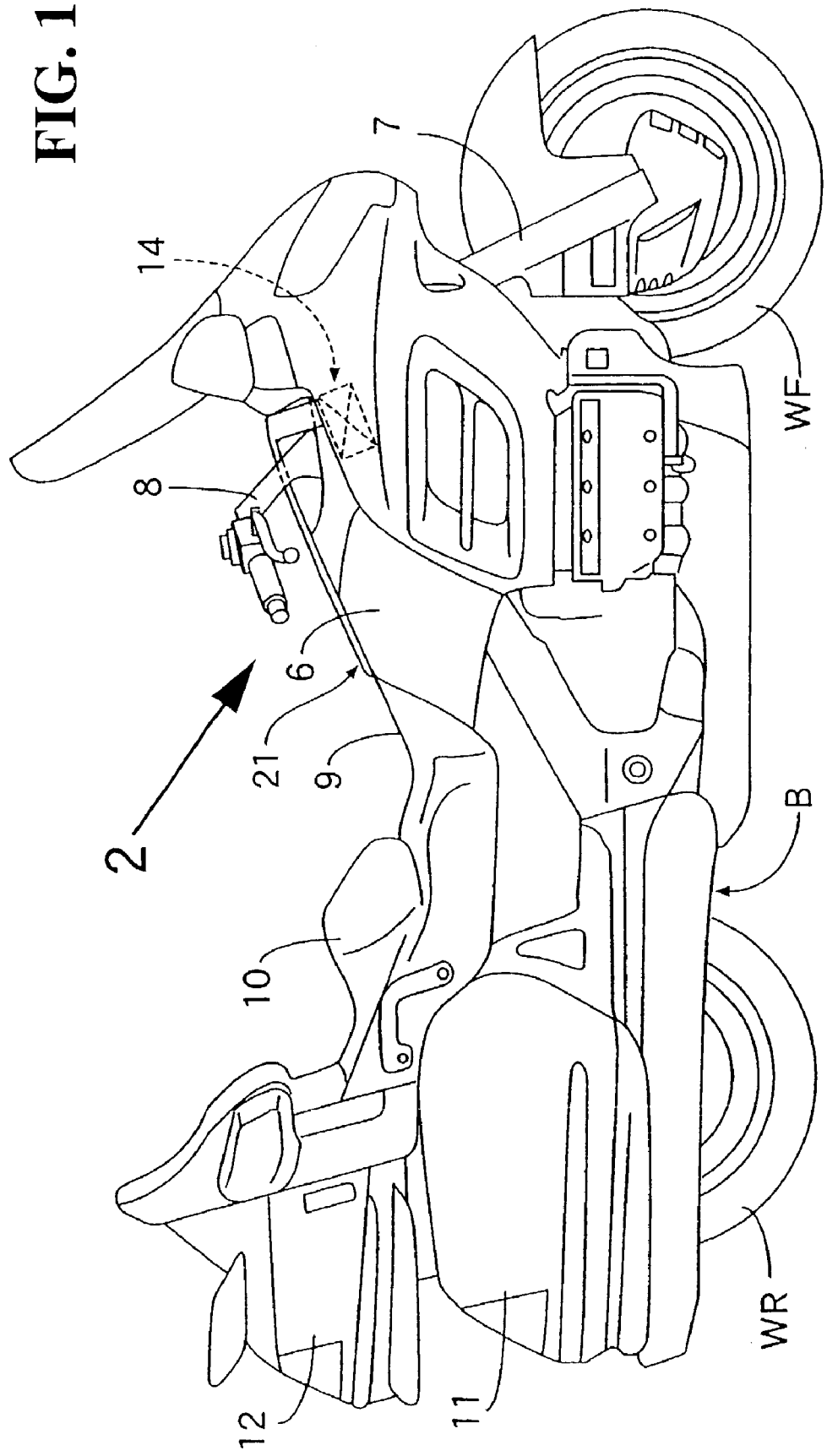
FIG. 1 is a side elevation of a motorcycle.

In the following, an embodiment of the present invention is described in connection with an example of the present invention shown in the accompanying drawings. It should be noted that the same reference numerals have been used to identify the same or similar elements throughout the several views.

Figure 2:
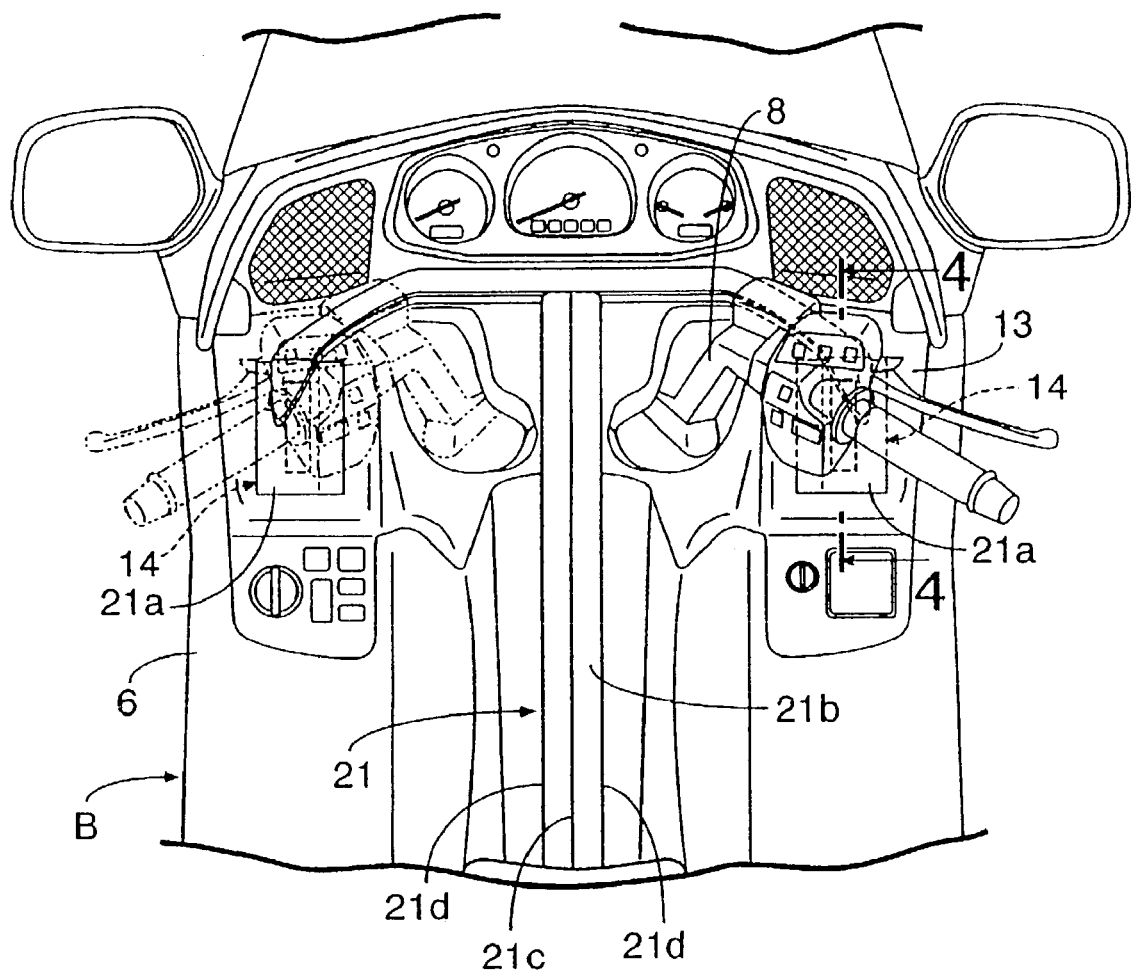
FIG. 2 is a view in a direction indicated by an arrow 2 in FIG. 1.
Figure 3:
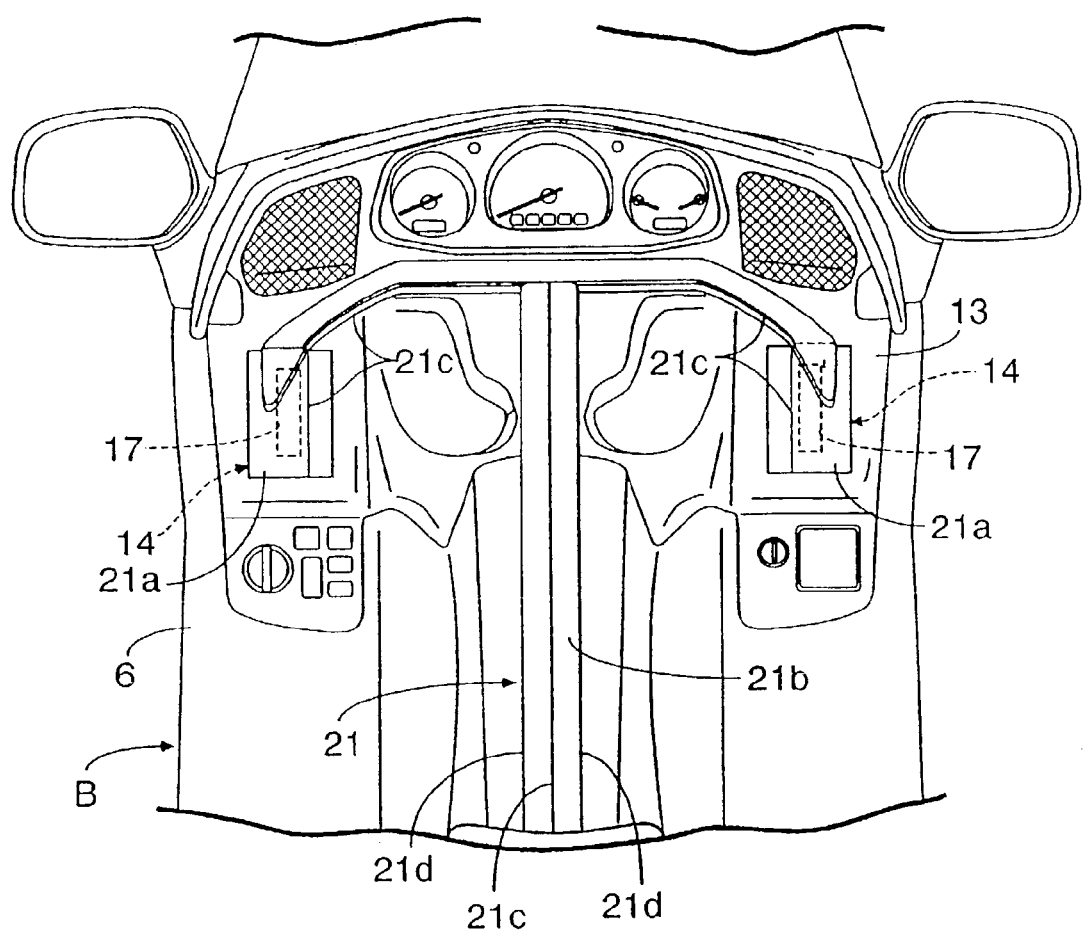
FIG. 3 is a view corresponding to FIG. 2 but in a state wherein a steering handle bar is omitted for clarity.
Figure 4:
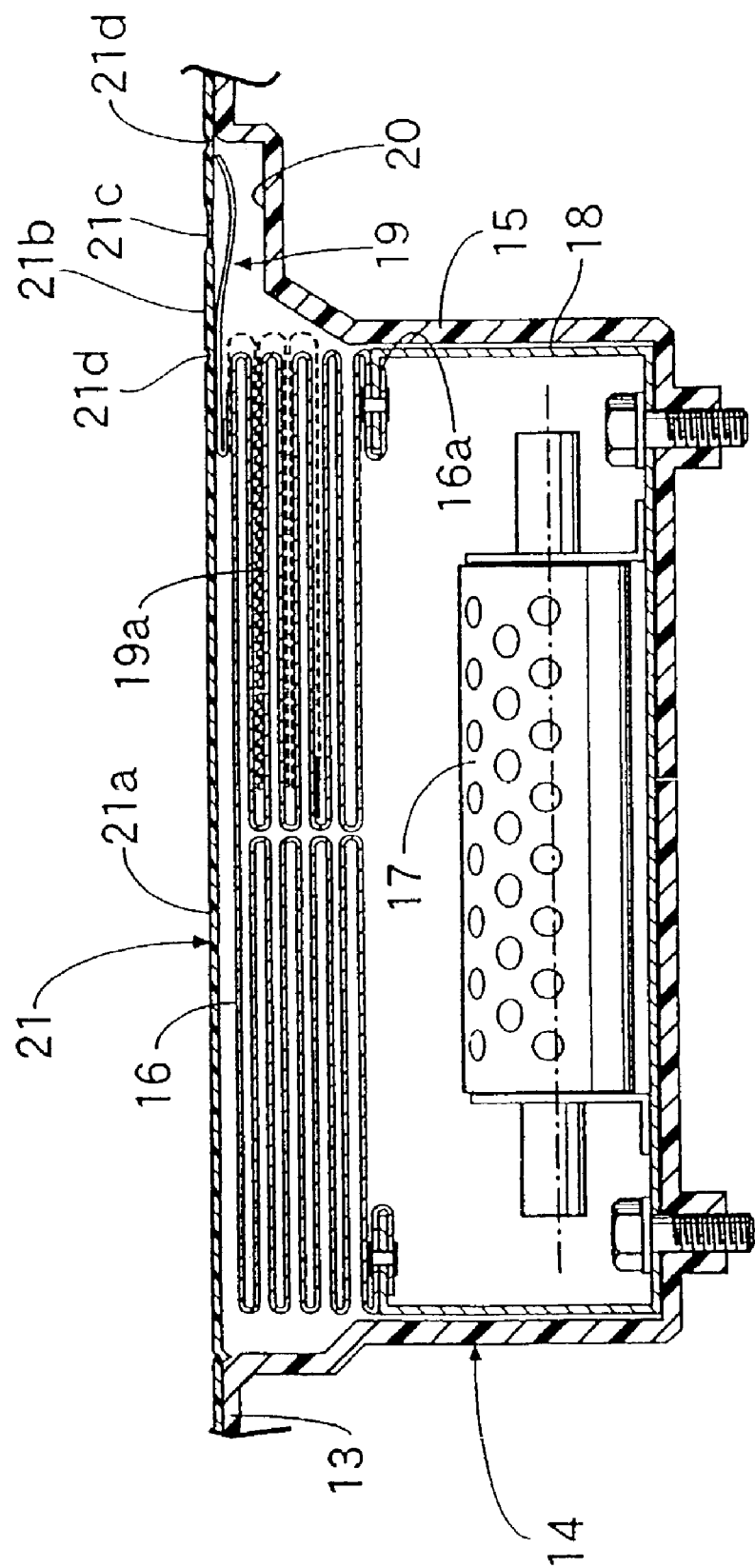
FIG. 4 is an enlarged sectional view taken along line 4—4 of FIG. 2.
Figure 5:
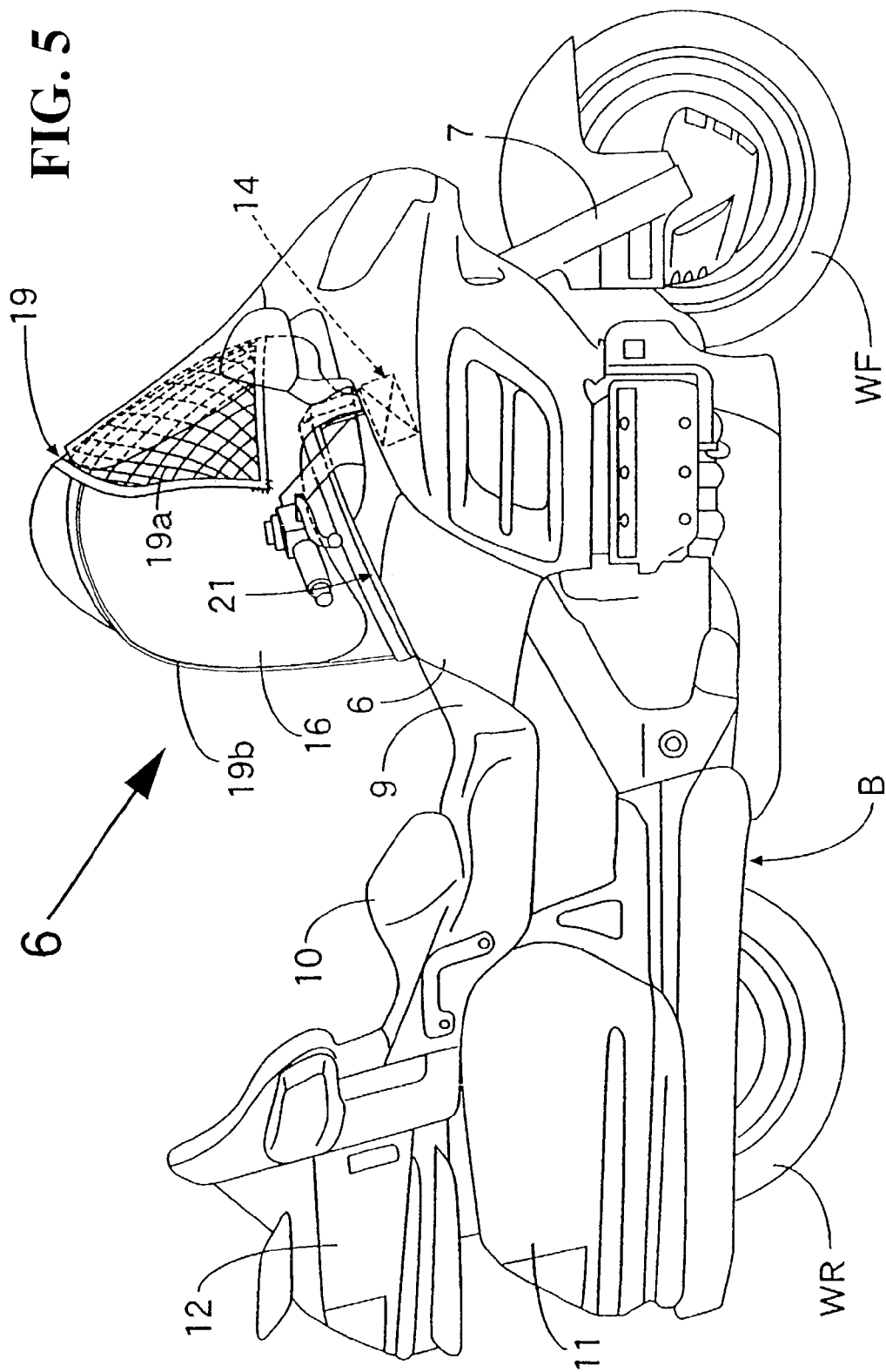
FIG. 5 is a side elevational view corresponding to FIG. 1 but in a state wherein the air bags are inflated and expanded.
Figure 6:
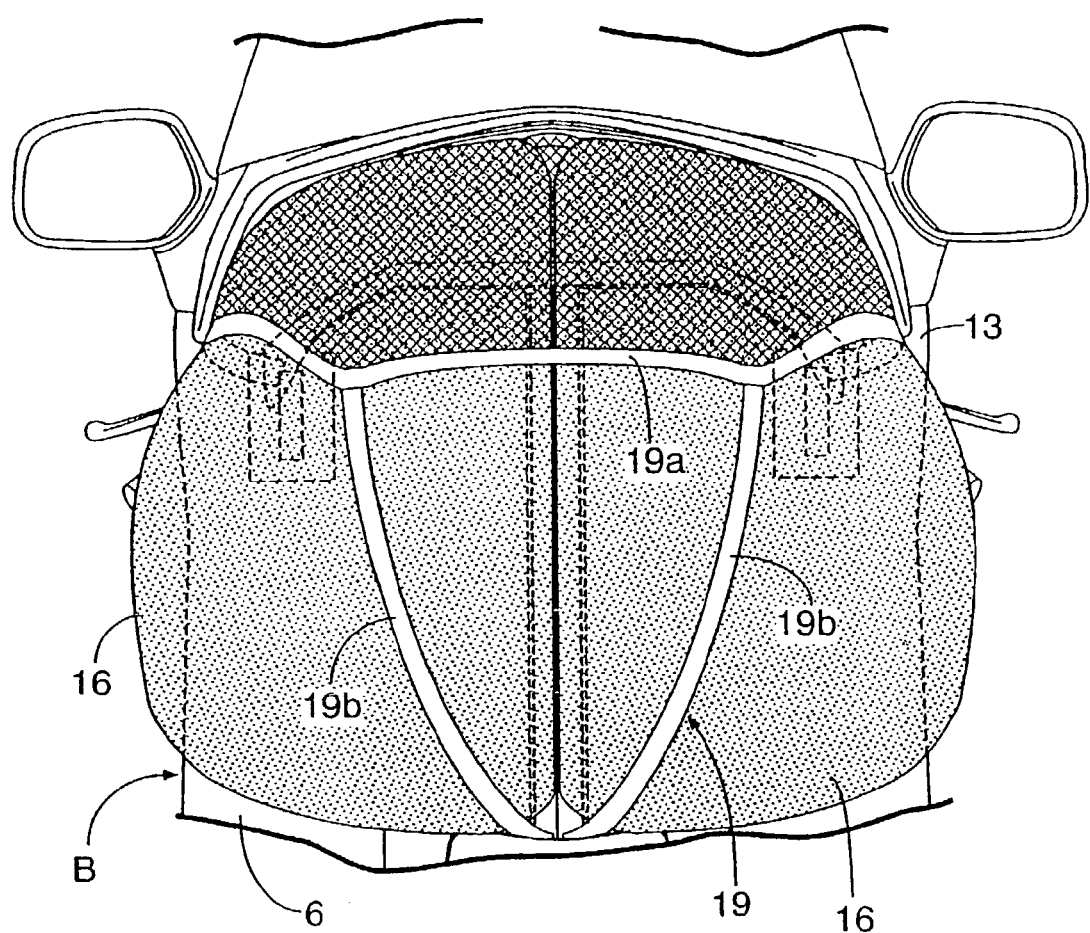
FIG. 6 is a view in a direction of an arrow 6 in FIG. 5.

FIGS. 1 to 6 show an example of the present invention. FIG. 1 is a side elevation of a motorcycle. FIG. 2 is a view in a direction indicated by an arrow 2 in FIG. 1. FIG. 3 is a view corresponding to FIG. 2 but in a state wherein a steering handle bar is omitted for clarity. FIG. 4 is an enlarged sectional view taken along line 4—4 of FIG. 2. FIG. 5 is a side elevational view corresponding to FIG. 1 but in a state wherein the air bags are inflated and expanded. FIG. 6 is a view in a direction of an arrow 6 in FIG. 5.

Referring first to FIG. 1, a body B of the motorcycle V includes a body frame (not shown), which is covered with a body cover 6 made of a resin material. A front wheel WF is supported rotationally at a lower end of a front fork 7 supported for steering movement at a front end of the body frame. A steering handle bar 8 is connected to an upper portion of the front fork 7. Furthermore, a rear portion of the vehicle body B includes a main scat 9 for seating a driver in such a manner as to be positioned above a rear wheel WR.

A pillion seat 10 is provided for seating a passenger on the rear side with respect to the main seat 9. Side bags 11 are disposed on the left and right of the rear wheel WR. Furthermore, a trunk 12 is disposed upwardly of the rear wheel WR, rearwardly of the pillion seat 10.

Referring also to FIGS. 2 and 3, an instrument panel 13, which can be visually observed by a driver on the main seat 9, is provided at a front portion of the body B. A plurality of air bag modules 14 are provided in the instrument panel 13. In the present example, a pair of left and right air bag modules 14, 14 are provided on the opposite left and right sides of the instrument panel 13. However, it should be understood that additional air bag modules 14 could also be provided at other locations on the instrument panel 13 in addition to or as an alternative to the pair of left and right air bag modules 14, 14.

Referring to FIG. 4, each air bag module 14 includes an air bag housing 15 formed in the shape of a box. The air bag housing 15 is open at an upper end thereof and is formed integrally with the instrument panel 13. An air bag 16 is accommodated in the air bag housing 15. Furthermore, an inflator 17 is provided for generating gas for inflating and expanding the air bag 16.

An opening 16a of the air bag 16 is accommodated in a folded state in the air bag housing 15. The opening 16a is attached in an airtight manner to an upper open end of a supporting box 18, which is formed in the shape of a box. The supporting box 18 is open at an upper end thereof and is accommodated in the air bag housing 15 and is secured to the air bag housing 15, and the inflator 17 is attached to a lower closed end of the supporting box 18.

Incidentally, a connecting net 19 serving as a connection mechanism is connected at one end side thereof to one of the air bags 16 of the air bag modules 14, 14 disposed on the opposite sides of the instrument panel 13. In particular, the pair of left and right air bags 16 accommodated in a folded state on the opposite sides of the instrument panel 13 are connected to each other by the connecting net 19. In addition, the connecting net 19 is fixedly fastened at the other end thereof to the body B immediately forwardly of the main seat 9.

Referring further to FIGS. 5 and 6, the connecting net 19 includes a net portion 19a which connects the two air bags 16 to each other, upon inflation and expansion of the two air bags 16, in such a manner that it covers parts of the two air bags 16. A pair of supporting rope portions 19b, 19b are each connected at one end thereof to the net portion 19a. In addition, each of the two supporting rope portions 19b, 19b is connected at one end thereof to the net portion 19a such that, upon inflation and expansion of the two air bags 16, the two supporting rope portions 19b, 19b expand into a substantially V-shape in plan while the other ends of the two supporting rope portions 19b, 19b are securely fastened to the body B immediately forwardly of the main seat 9.

A substantially T-shaped accommodating groove 20 is in communication with the insides of the two air bag housings 15. The accommodating groove 20 is formed on an upper face of the body B and extends from a position immediately forwardly of the main seat 9 to the locations of the two air bag modules 14, 14. The connecting net 19 is accommodated in the accommodating groove 20 with the two air bags 16 accommodated in a folded state in the air bag housings 15.

Furthermore, a cover 21 made of a synthetic resin material is attached to the upper face of the body B. The cover 21 includes first lid portions 21a, 21a which cover over upper end openings of the air bag housings 15 of the two air bag modules 14, 14 and a second lid portion 21b formed integrally with the first lid portions 21a, 21a in a substantially T-shape in such a manner as to cover over the accommodating groove 20. The second lid portion 21b connects the two first lid portions 21a, 21a.

In addition, a fragile portion 21c extends from a central portion in a widthwise direction of the second lid portion 21b to central portions of the two first lid portions 21a, 21a and hinge portions 21d, 21d are disposed on the opposite sides of the fragile portion 21c. The fragile portion 21c and the hinge portions 21d are formed on the cover 21. The cover 21 is formed such that it can be broken readily by force acting upon the cover 21 by inflation and expansion of the two air bags 16. Operation of the connecting net 19 is in response to the inflation and expansion of the two air bags 16. In response to the break of the fragile portion 21c, the cover 21 is opened around the hinge portions 21d, 21d. In particular, the connecting net 19 is accommodated in the accommodating groove 20 of the body B when the two air bags 16 are in a folded state. However, upon inflation and expansion of the two air bags 16, the connecting net 19 breaks the cover 21 and projects outwardly from the body B.

Subsequently, action of the present example is described. A plurality of, for example, a pair of left and right, air bags 16 are accommodated in a folded state on the opposite sides of the instrument panel 13. The net portion 19a on one end side of the connecting net 19 is accommodated in the body B when the two air bags 16 are in the folded state. However, the net portion 19a projects from the body B to connect the two air bags 16 to each other, upon inflation and expansion of the two air bags 16. The net portion 19a is connected to the two air bags 16. In other words, the pair of left and right air bags 16, which can constrain a driver on the pillion seat 10 from a forward direction, are connected to each other by the connecting net 19 the pair of air bags 16 are accommodated in a folded state on the opposite left and right sides of the instrument panel 13.

Accordingly, when the pair of air bags 16 are inflated and expanded, the two air bags 16 are connected to each other by the connecting net 19 and are expanded over a wide range as shown in FIG. 6. Thus, the function of a large size air bag can be accomplished by the pair of small size air bags 16. Accordingly, a wide range of expansion can be covered by the pair of air bags 16 to constrain the driver effectively.

In addition, since each of the air bags 16 may be of a small size, it is easy to assure the space for accommodating the air bags 16. Accordingly, the air bag apparatus can be applied to a conventional small size vehicle which includes the instrument panel 13 without a significant design change.

Furthermore, since the pair of supporting rope portions 19b, 19b, which form part of the connecting net 19, are securely fastened to the body B, leftward and rightward movements of the pair of left and right inflated and expanded air bags 16 can be restricted by the connecting net 19 securely fastened to the body B to constrain the driver effectively.

While, in the example described above, the two air bags 16 are connected to each other by the connecting net 19 having the net portion 19a, it is otherwise possible to use a connection belt which does not have a net portion as a connection mechanism in place of the connecting net 19.

While the example of the present invention is described above, the present invention is not limited to the example described above, but various design alterations can be made without departing from the present invention recited in the claims.

As described above, according to the first aspect of the present invention, the driver can be constrained effectively by the air bags having a wide expansion range. In addition, the air bag apparatus can be applied to a conventional small size vehicle without a significant design change.

Furthermore, according to the second aspect of the present invention, leftward and rightward movements of the pair of left and right inflated and expanded air bags can be restricted by the connection mechanism securely fastened to the vehicle body to constrain the driver effectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag apparatus for a small size vehicle, comprising:
   a seat for a driver, said seat being provided at a rear portion of a vehicle body;
   an instrument panel which a driver on said seat can visually observe, said instrument panel being provided at a front portion of said vehicle body;
   a plurality of air bags which can constrain the driver on said seat from a forward direction, said plurality of air bags being accommodated in a folded state in said instrument panel;
   a plurality of inflators for inflating said plurality of air bags, respectively, each of said plurality of inflators being located within said instrument panel; and
   a connection mechanism, said connection mechanism connecting said plurality of air bags to each other,
   wherein said connection mechanism is for connecting a pair of left and right air bags of said plurality of air bags to each other, said connection mechanism being securely connectable to said vehicle body, said pair of left and right air bags being accommodated in a folded state on opposite left and right sides of said instrument panel.

2. The air bag apparatus for a small size vehicle according to claim 1, said air bag apparatus further comprising a plurality of air bag modules provided in opposite left and right sides of said instrument panel, each of said plurality of air bag modules including one of said plurality of air bags, each of said plurality of air bags being connected to each other by said connection mechanism.

3. The air bag apparatus for a small size vehicle according to claim 2, wherein said plurality of inflators are located within said plurality of air bag modules, respectively.

4. The air bag apparatus for a small size vehicle according to claim 2, wherein said connecting mechanism is a connecting net, said connecting net being connected at one side thereof to one of said plurality of air bags and at another end thereof to another of said plurality of air bags, said connecting net being connectable to the small size vehicle immediately forwardly of said seat.

5. The air bag apparatus for a small size vehicle according to claim 1, wherein each of said plurality of inflators is located within said instrument panel on the opposite left and right sides of said instrument panel.

6. The air bag apparatus for a small size vehicle according to claim 1, wherein said connecting mechanism is a connecting net, said connecting net being connected at one side thereof to one of said plurality of air bags and at another end thereof to another of said plurality of air bags, said connecting net being connectable to the small size vehicle immediately forwardly of said seat.

7. The air bag apparatus for a small size vehicle according to claim 1, wherein said connecting mechanism is a connecting net, said connecting net being connected at one side thereof to said left of said plurality of air bags and at another end thereof to said right of said plurality of air bags, said connecting net being connectable to the small size vehicle immediately forwardly of said seat.

8. A small size vehicle, comprising:
   a vehicle body;
   a seat for a driver, said seat being provided at a rear portion of a vehicle body;
   an instrument panel which a driver on said seat can visually observe, said instrument panel being provided at a front portion of said vehicle body;
   a plurality of air bag modules provided in opposite left and right sides of said instrument panel;
   a plurality of air bags which can constrain the driver on said seat from a forward direction, said plurality of air bags being accommodated in a folded state in said instrument panel, each of said plurality of air bag modules including one of said plurality of air bags;
   a plurality of inflators for inflating said plurality of air bags, respectively, each of said plurality of inflators being located within said instrument panel; and
   a connection mechanism, said connection mechanism connecting said plurality of air bags to each other.

9. The small size vehicle according to claim 8, wherein said connection mechanism is for connecting a pair of left and right air bags of said plurality of air bags to each other, said connection mechanism being securely fastened to said vehicle body, said pair of left and right air bags being accommodated in a folded state on opposite left and right sides of said instrument panel.

10. The small size vehicle according to claim 9, wherein each of said plurality of inflators is located within said instrument panel on the opposite left and right sides of said instrument panel.

11. The small size vehicle according to claim 9, wherein said connecting mechanism is a connecting net, said connecting net being connected at one side thereof to said left of said plurality of air bags and at another end thereof to said right of said plurality of air bags, said connecting net being connected to the small size vehicle immediately forwardly of said seat.

12. The small size vehicle according to claim 8, wherein said plurality of inflators are located within said plurality of air bag modules, respectively.

13. The small size vehicle according to claim 8, wherein said connecting mechanism is a connecting net, said connecting net being connected at one side thereof to one of said plurality of air bags and at another end thereof to another of said plurality of air bags, said connecting net being connected to the small size vehicle immediately forwardly of said seat.

14. The small size vehicle according to claim 8, wherein said connecting mechanism is a connecting net, said connecting net being connected at one side thereof to one of said plurality of air bags and at another end thereof to another of said plurality of air bags, said connecting net being connected to the small size vehicle immediately forwardly of said seat.

15. An air bag apparatus for a small size vehicle, comprising:
   a seat for a driver, said seat being provided at a rear portion of a vehicle body;

an instrument panel which a driver on said seat can visually observe, said instrument panel being provided at a front portion of said vehicle body;
a plurality of air bags which can constrain the driver on said seat from a forward direction, said plurality of air bags being accommodated in a folded state in said instrument panel; and
a connection mechanism, said connection mechanism connecting said plurality of air bags to each other, wherein said connecting mechanism is a connecting net, said connecting net being connected at one side thereof to one of said plurality of air bags and at another end thereof to another of said plurality of air bags, said connecting net being connectable to the small size vehicle immediately forwardly of said seat.

* * * * *